(12) United States Patent
Ramani et al.

(10) Patent No.: US 7,124,354 B1
(45) Date of Patent: Oct. 17, 2006

(54) ENTERPRISE APPLICATION TRANSACTIONS AS SHARED ACTIVE DOCUMENTS

(75) Inventors: Sriram Ramani, Fremont, CA (US); Sekhar Sarukkai, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/533,781

(22) Filed: Mar. 24, 2000

(51) Int. Cl.
*G06F 17/00* (2006.01)
*G06F 17/24* (2006.01)
*G06Q 30/00* (2006.01)
*G06F 15/16* (2006.01)

(52) U.S. Cl. .................. 715/501.1; 715/513; 709/201; 709/203; 705/26; 705/28

(58) Field of Classification Search ............. 715/501.1, 715/513; 705/26, 27, 28, 29, 75, 77; 709/203, 709/201; 707/1, 104.1
See application file for complete search history.

(56) References Cited

U.S. PATENT DOCUMENTS

| | | | | |
|---|---|---|---|---|
| 5,603,025 | A * | 2/1997 | Tabb et al. ..................... | 707/2 |
| 6,220,509 | B1 * | 4/2001 | Byford ........................ | 235/375 |
| 6,298,352 | B1 * | 10/2001 | Kannan et al. ............... | 707/12 |
| 6,362,838 | B1 * | 3/2002 | Szlam et al. ................. | 715/762 |
| 6,463,420 | B1 * | 10/2002 | Guidice et al. ............... | 705/28 |
| 6,493,731 | B1 * | 12/2002 | Jones et al. ............... | 715/501.1 |
| 6,557,015 | B1 * | 4/2003 | Bates et al. ............... | 715/501.1 |
| 6,587,837 | B1 * | 7/2003 | Spagna et al. ................. | 705/26 |
| 6,609,113 | B1 * | 8/2003 | O'Leary et al. ............... | 705/39 |
| 6,701,485 | B1 * | 3/2004 | Igra et al. .................... | 715/503 |
| 6,725,429 | B1 * | 4/2004 | Gardner et al. ............. | 715/530 |
| 6,757,710 | B1 * | 6/2004 | Reed .......................... | 709/203 |
| 2004/0193552 | A1 * | 9/2004 | Ikenaga et al. ............... | 705/75 |
| 2004/0225546 | A1 * | 11/2004 | Oberdorfer et al. ............ | 705/8 |

OTHER PUBLICATIONS

W3C, "Extensible Markup Language (XML) 1.0", Feb. 10, 1998, http://www.w3.org/TR/1998/REC-xml-19980210#sec-intro.*
XML Programming With C++, Fabio Arciniegas A, Nov. 17, 1999, http://www.xml.com/pub/a/1999/11/cplus/.*
Microsoft Office 97, "Getting Results with Microsoft Office 97", Dec. 31, 1997, pp. 28, 169-175, 408, 425, and 427-432.*

* cited by examiner

*Primary Examiner*—Stephen Hong
*Assistant Examiner*—Adam L. Basehoar

(57) ABSTRACT

The present invention is directed to a method for a creating an active document that encapsulates a transaction and the transaction's current status. The active document includes a first set of data fields, where the data fields represent attributes of a parent transaction and include a sub-identifier field; and a first set of metadata, where the first set of metadata populates the first set of data fields and describes the attributes represented by the first set of data fields, the sub-identifier filed including metadata from the first set of metadata that identifies a secondary transaction, linking data generated by the secondary transaction to the active document.

17 Claims, 7 Drawing Sheets

US 7,124,354 B1

ENTERPRISE APPLICATION TRANSACTIONS AS SHARED ACTIVE DOCUMENTS

FIELD OF THE INVENTION

The field of the invention is business processes over the Internet, and more particularly, systems for improving the sharing and accessing of information regarding transactions.

BACKGROUND OF THE INVENTION

In enterprise applications today, databases are used to store a high volume of data. More often than not, even in the smallest enterprises, data from various transactions is stored in a number of different databases. The data is generated by a diverse set of different business applications which make organizing and accessing the data quite challenging. Together with the high volume of data and the number of different databases, this makes translating the data into usable information a huge and time consuming task. This costs the very purpose of information—timeliness.

The origins of all this data are transactions. Each transaction sets off a chain event of business processes. For example, one Purchase Order transaction creates a web of business events and more transactions in the originating enterprise's business process. The creation of these business events and transactions continues until the life of the Purchase Order finally comes to an end. The data created by the Purchase Order also has an effect on a destination enterprise in which a corresponding Sales Order transaction is created to process the purchase request from the originating enterprise. Maintaining linkages between these two transactions is not an easy task, especially if they are long-lived.

If an enterprise wishes to know the status of a Purchase Order it placed with a supplier enterprise, it presently takes a physical contact, often a phone call or a facsimile, between persons in each enterprise. Generally, it takes a few days at best before an adequate answer can be provided. This process and the time it takes is an aberration in the age of the Internet. There needs to be a way for a person in the originating enterprise to access the status of the Purchase Order, or other transaction, emanating from the originating enterprise quickly and easily. The person in the originating enterprise should be able to access not only information from the web of business events and other transactions in the originating enterprise, but also from the web of business events and transactions resulting from the Sales order, or other linked transactions, in the supplier enterprise.

SUMMARY OF THE INVENTION

An active document represents a transaction and enables a user to determine the status of the transaction and obtain information about the transaction by accessing and viewing the active document. The active document comprises a first transaction resource which describes a transaction created at a first enterprise. The first transaction resource comprises metadata that provides the attributes of the first transaction resource.

The metadata is organized into service specific data ("SSD") fields. The SSD fields include identifiers of one or more sub-transaction resources that describe additional transactions or processes created as a result of the transaction. These identifiers link the first transaction resource with the one or more sub-transaction resources. This link allows the active document to contain all the information relevant to the transaction, including information from both the first enterprise and other enterprises. After the first transaction resource is registered, it is constantly updated with any new data from one or more sub-transaction resources due to this link. Consequently, the user can access and view the active document to determine the status of the transaction and obtain any information about the transaction.

The active document enables enterprises to move away from the prior modes of communication with each other. The active document provides an easy method of obtaining information from one source without having to translate the data from numerous databases. The active document not only provides more efficient inter-enterprise transactions, but also enables improvement in intra-enterprise operations since an enterprise can keep track of its internal transactions with active documents.

An embodiment of the invention is an active document encapsulating a transaction and the transaction's current status, comprising a first set of data fields, wherein the data fields represent attributes of a parent transaction and include a sub-identifier field; and a first set of metadata, wherein the first set of metadata populates the first set of data fields and describes the attributes represented by the first set of data fields, the sub-identifier field including metadata from the first set of metadata that identifies a secondary transaction, linking data generated by the secondary transaction to the active document. This embodiment of the invention may be created by creating a parent transaction resource, wherein the parent transaction resource represents a parent transaction and is linked to data generated by a secondary transaction, the creating a parent transaction resource step comprising the steps of generating a first set of data fields, wherein the first set of data fields represent attributes of the parent transaction and include a sub-identifier field; and populating the first set of data fields with a first set of metadata, wherein the metadata describes the attributes represented by the data fields.

DETAILED DESCRIPTION OF THE INVENTION

Figure 2:
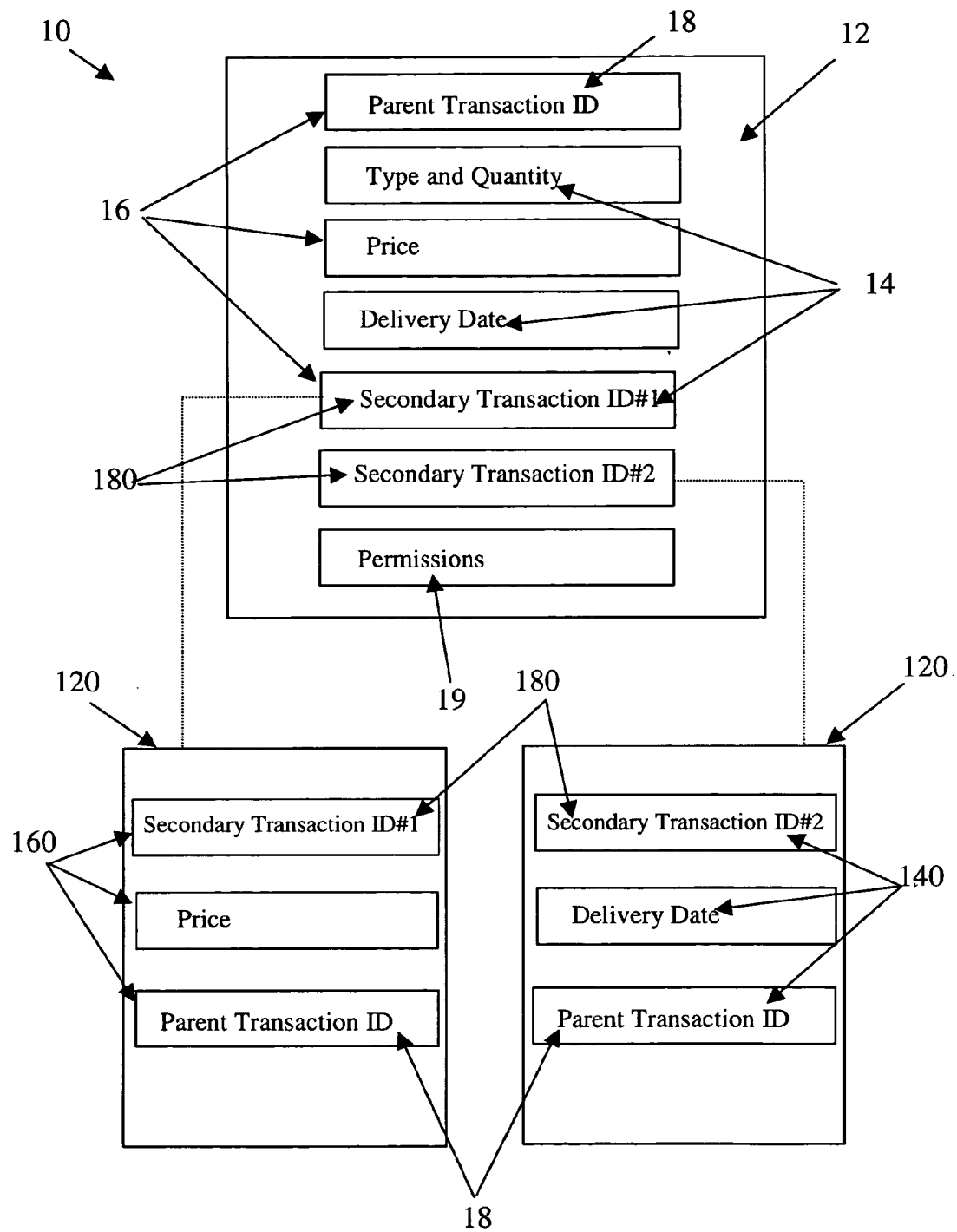
FIG. 2 is a diagram of an embodiment of the present invention.

As shown in FIG. 2, the invention is an active document 10. An active document 10 is created when a transaction is initiated between two or more enterprises. The active document 10 encapsulates the current status of the transaction, enabling a user to view the transaction as represented by the active document 10. The active document comprises relevant information about the transaction which the user can see simply by looking at the active document 10.

The active document 10 is shared among enterprises between whom an initial transaction is being conducted. Any subsequent processes or transactions spun off or triggered by the initial transaction are linked to the active document 10. The information produced by these processes and transactions are also viewable from the active document 10. The active document 10 is destroyed when it is no longer of interest (e.g., the initial transaction and all processes triggered by the initial transaction have been completed).

Active documents 10 are implemented on platforms or infrastructures that facilitate electronic transactions between enterprises. The embodiment of the invention described below utilizes the mechanisms of e-speak technology as described in "e-speak Architecture Specification," version Beta 2.2, December 1999 and "e-speak Web Access Programmers Guide," version Beta 2.2, December 1999 (collectively, "the e-speak documents"), which are herein incorporated by reference. E-speak technology is a platform that provides a computational model based on a set of services a user accesses as needed. The invention, however, may be implemented on any similar infrastructure or platform and is not limited to e-speak technology.

Figure 1A:
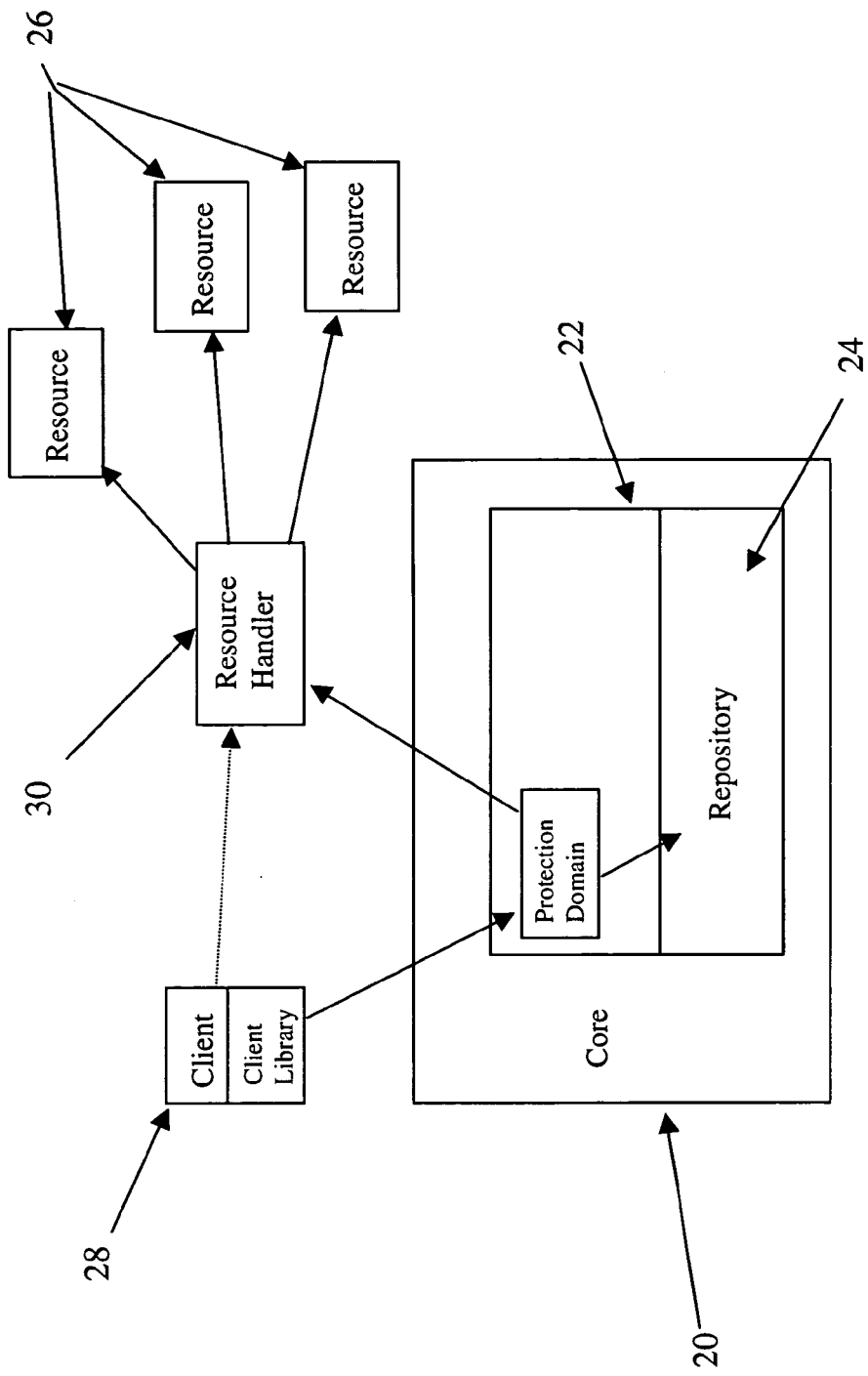
FIG. 1a is a block diagram of a platform supporting the present invention.

FIG. 1a shows an instance of the e-speak platform called a logical machine 20. The logical machine 20 comprises a core 22 and a repository 24. Also shown in FIG. 1a are resources 26, a client 28, and a resource handler 30. One or more logical machines 20 may be on a single physical machine. Likewise, the components of a single logical machine 20 may be distributed across multiple physical machines. Accordingly, the e-speak platform contemplates three models for a local logical machine 20: a centralized site, an enterprise site, or a vertical marketplace. The centralized site hosts every logical machine 20. The enterprise site hosts an enterprise's logical machine 20. The vertical marketplace is hosted by a third-party and is the most efficient model. The vertical marketplace model is utilized for the active document 10 embodiments described below.

Figure 1B:
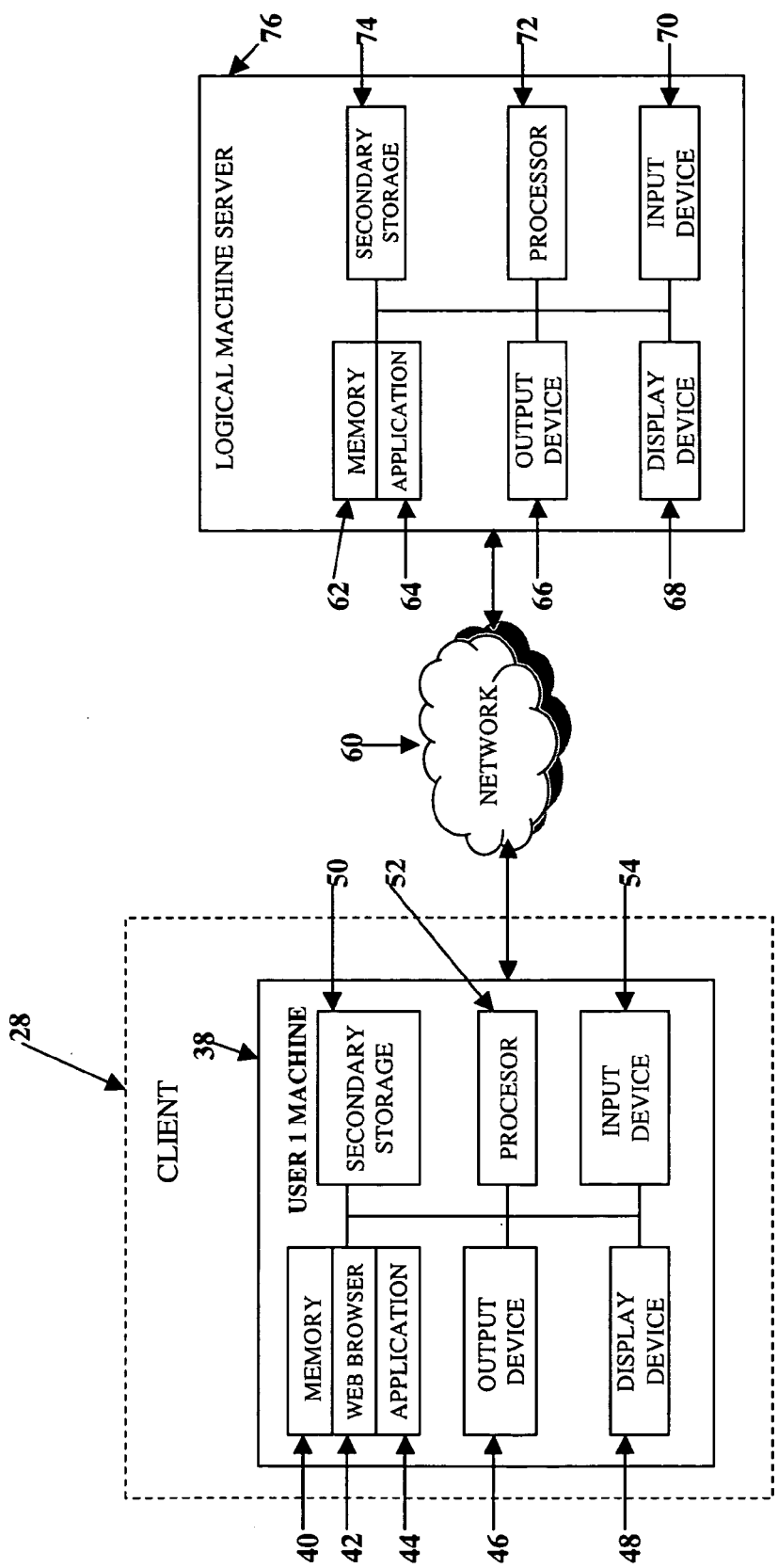
FIG. 1b is a block diagram of hardware supporting the platform.

As shown in FIG. 1b, a physical machine may be a server 76. A server 76 typically includes a memory 62, a secondary storage device 74, a processor 72, an input device 70, a display device 68, and an output device 66. Memory 62 may include RAM or similar types of memory, and it may store one or more applications 64 for execution by processor 72. Secondary storage device 74 may include a hard disk drive, floppy disk drive, CD-ROM drive, or other types of non-volatile data storage. Processor 72 may execute one or more applications or programs stored in memory 62 or secondary storage 74, or received from the Internet or other network 60. Input device 70 may include any device for entering information into server 76, such as a keyboard, mouse, cursor-control device, touch-screen, microphone, digital camera, video recorder or camcorder. Display device 68 may include any type of device for presenting visual information such as, for example, a computer monitor or flat-screen display. Output device 66 may include any type of device for presenting a hard copy of information, such as a printer, and other types of output devices, including speakers or any device for providing information in audio form Referring again to FIG. 1a, the core 22 is the active entity of the logical machine 20. The core 22 mediates and controls access to resources 26 registered in the repository 24. The repository 24 is the passive entity of the logical machine 20. The repository 24 stores metadata from one or more resources 26. Resources 26 provide a uniform description of active entities and passive entities that are accessed through the e-speak platform. A resource 26 may describe, for example, a file, a printer, a Java object, a legacy application, or any other hardware device or computational service. Each resource 26 comprises metadata that describes the entity, and a state, which is data needed to implement the entity. For example, a file resource is a description of the attributes of the file and how the file may be accessed. The metadata is preferably written in Extensible Mark-up Language (XML), but, other similar languages may be used. The use of XML allows resources 26 to be accessed and viewed through a web-browser, such as Internet Explorer® or Netscape Navigator®.

The client 28 is any active entity that uses the e-speak platform to process a request for a resource 26. Users at a client 28, and other clients not shown, interact with the core 22. As shown in FIG. 1b, a client 28 includes a user machine 38 connected with a network 60 such as the Internet, providing a network connection to the logical machine 20. Examples of user machines include personal computers, laptop computers, notebook computers, palm top computers, network computers, or any processor-controlled device capable of executing a web browser or other type of application for interacting with the system.

User machine 38 illustrates typical components of a user machine. User machine 38 typically includes a memory 40, a secondary storage device 50, a processor 52, an input device 54, a display device 48, and an output device 46. Memory 40 may include random access memory (RAM) or similar types of memory, and it may store one or more applications 44, and a web browser 42, for execution by processor 52. Secondary storage device 50 may include a hard disk drive, floppy disk drive, CD-ROM drive, or other types of non-volatile data storage. Processor 52 may execute applications or programs stored in memory 40 or secondary storage 50, or received from the Internet or other network 60. Input device 54 may include any device for entering information into machine 38, such as a keyboard, mouse, cursor-control device, or touch-screen. Display device 48 may include any type of device for presenting visual information such as, for example, a computer monitor or flat-screen display. Output device 46 may include any type of device for presenting a hard copy of information, such as a printer, and other types of output devices, including speakers for providing information in audio form.

Web browser 42 is used to interact with the core 22 and resources 26. Examples of web browsers include Internet Explorer® and Netscape Navigator®. Any web browser or other application capable of retrieving content from a network and displaying pages or screens may be used.

The resource handler 30 is responsible for responding to requests for access to one or more resources 26. To access a resource 26, the client 28 sends a message to the core 22 identifying the resource 26. The core 22 uses resource 26 metadata, stored in the repository 24, to determine if the client 28 is permitted to access the resource 26 and to locate the resource handler 30. If access is permitted, the core 22 forwards the message to the resource handler 30 that, in turn, physically accesses the resource 26. The resource 26 may be stored in the physical machine described above or at some other location.

FIG. 2 illustrates an embodiment of the present invention. In the embodiment shown, the active document 10 comprises a parent transaction resource 12 that is electronically linked to one or more sub-transaction resources 120, as described below. A parent transaction resource 12 comprises metadata 14 describing a parent transaction initiated between two or more enterprises, such as a purchase order, and service specific data ("SSD") fields 16. The metadata 14 is organized in the SSD fields 16. Metadata is data that is used to describe a resource. Each SSD field 16 includes or is populated with metadata 14 describing one or more attributes of the parent transaction. For example, as seen in FIG. 2, the SSD fields 16 may include metadata 14 describing the type, the quantity, the price, or the expected date of delivery of a product or service.

The SSD fields 16 also include an identifier 18, one or more sub-identifiers 180, and permissions 19. The identifier 18 includes metadata 14 that identifies the parent transaction resource 12 and is used by sub-transaction resources 120, and clients 28, to access the parent transaction resource 12. Likewise, the one or more sub-identifiers 180 identify one or more sub-transaction resources 120 and are used by the parent transaction resource 12 to access the one or more sub-transaction resources 120. The permissions 19 identifies the clients 28 permitted access to the parent transaction resource 12 and, therefore, control who can view the active document 10. An SSD field 16 will also identify the resource handler 30 for the parent transaction resource 12.

Together, the identifier 18 and the sub identifiers 180 link the parent transaction resource 12 to the sub-transaction resources 120. The link is effected whenever the parent transaction resource 12 or sub-transaction resource 120 are accessed. For example, when the parent transaction resource 12 is accessed, the sub-identifiers 180 are used to access the sub-transaction resources 120 in order to update the SSD fields 16. The updating of the SSD fields 16 is described in further detail below.

Each sub-transaction resource 120 also comprises metadata 140 describing a process or secondary transaction, such as a sales order, created as a result of the parent transaction. The sub-transaction resource metadata 140 is also organized in SSD fields 160 of the sub-transaction resource 120. Similarly, each SSD field 160 includes metadata 140 describing one or more attributes of the sub-transaction resource 120. The sub-transaction resource SSD fields 160 also include a sub-identifier 180, which identifies the particular sub-transaction resource 120, and the identifier 18 described above. An SSD field 160 will also identify the resource handler 30 for the sub-transaction resource 120.

The SSD fields 160 also include transaction specific data 145 that is relevant to the parent transaction. The transaction specific data 145 corresponds to certain SSD fields 16 in the parent transaction resource 12. For example, as seen in FIG. 2, the transaction specific data 145 in a sub-transaction resource 120 is the price, which corresponds to a price SSD field 16. Accordingly, when the transaction specific data 145 is changed, the metadata 14 in the corresponding SSD field 16 will automatically be updated to incorporate this change.

Figure 3:
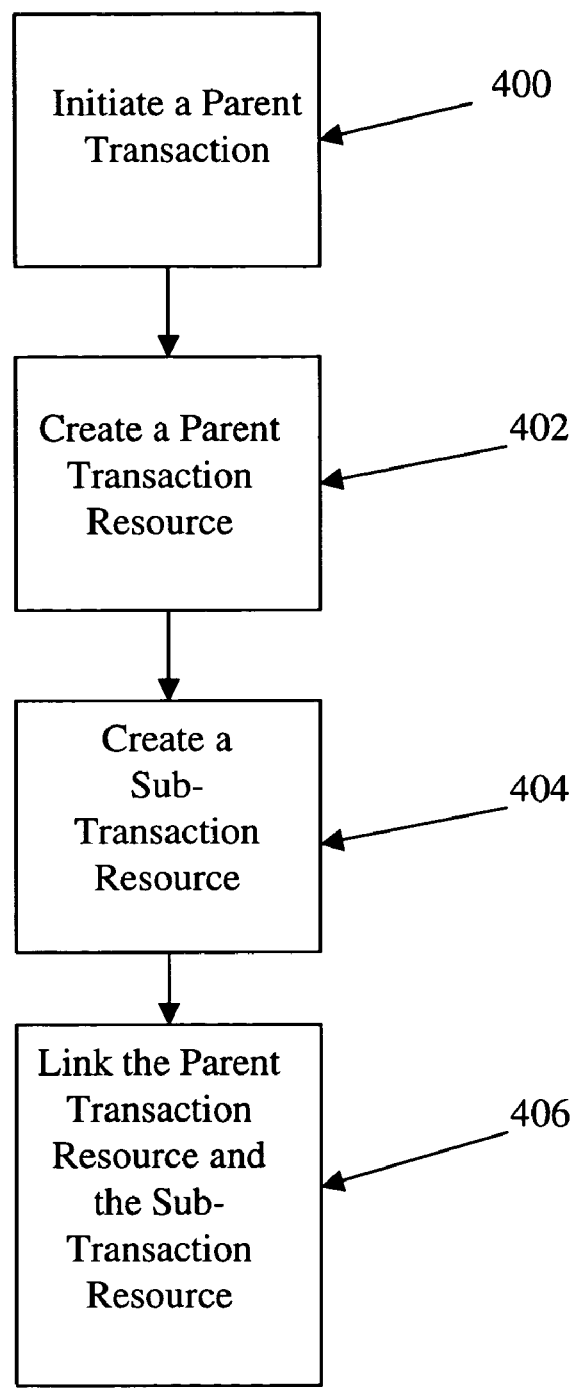
FIG. 3 is a flow-chart showing a method for creating the active documents.

FIG. 3 illustrates a method of creating an active document 10. The method shown comprises the steps of initiating a parent transaction 400, creating a parent transaction resource 402, creating a sub-transaction resource 404, and linking the parent transaction resource with the sub-transaction resource 406. The initiating step 400 is usually conducted by a first enterprise that determines to undertake a transaction, generally to purchase or sell products or services, between itself and a second enterprise. A purchase order is frequently used for such transactions and, therefore, may be the parent transaction. Consequently, in the present example, the initiating step 400 comprises submitting the purchase order.

The first creating step 402, comprises generating a plurality of data fields, the SSD fields 16, and populating (filing in) the SSD fields 16 of the parent transaction resource with data from the initiated parent transaction. Populating the SSD fields 16 comprises entering the metadata 14 into the SSD fields 16. The first creating step 402 further comprises registering the parent transaction resource 12 in the repository 24. The parent transaction resource 12 is registered in the repository 24 by saving the metadata 14 in the repository.

The second creating step 44 is similar to the first creating step 402. The second creating step 404 comprises populating the SSD fields 160 of the sub-transaction resource by entering the sub-transaction metadata 140 into the SSD fields 160 and registering the sub-transaction resource 120 in the repository 24 by saving the sub-transaction metadata 140 in the repository 24.

The linking step 406 comprises entering the sub-identifier 180 into the SSD fields 16 and entering the identifier 18 into the SSD fields 160. The identifier 18 is known at the time the sub-transaction resource 120 is created, so it is entered during the second creating step. However, the sub-identifier 180 is not always known when the parent transaction resource 12 is created. For example, the process or secondary transaction described by the sub-transaction resource 120 may not have been anticipated when the parent transaction resource 12 was created. If the sub-identifier 180 is known at the time the parent transaction resource 12 is created, then is entered during the first creating step 402 described above. If the sub-identifier 180 is not known at the time the parent transaction resource 12 is created, then it will be entered in the SSD fields 16 after the sub-transaction resource 120 is registered.

The above-described steps can be conducted programmatically. For example, the parent transaction resource can be created by submitting code written in XML format and submitted to the core 22. The code may be written with any suitable programming language for which there are libraries for creating and manipulating XML documents, such as Java, C++, Perl, and Python. The programming language should enable XML and web-based applications. The code would define the SSD fields 16 and provide the metadata 14 that populates the SSD fields 16. The code is submitted to the core 22 from a client 28. The core 22 saves the metadata 14 in the repository 24. The same process may be repeated for the sub-transaction resource 120.

Alternatively, the above-described steps can be conducted by submitting XML documents to the core 22 from a client 28. An XML document, representing the parent transaction (a purchase order) is created using an application capable of generating XML documents (e.g., a capable web browser or word processor). The XML document would include data fields (SSD fields 16) populated with data (metadata 14) describing the parent transaction. The core 22 saves the data in the data fields in the repository 24. The same process may be repeated for the sub-transaction resource 120

Figure 4:
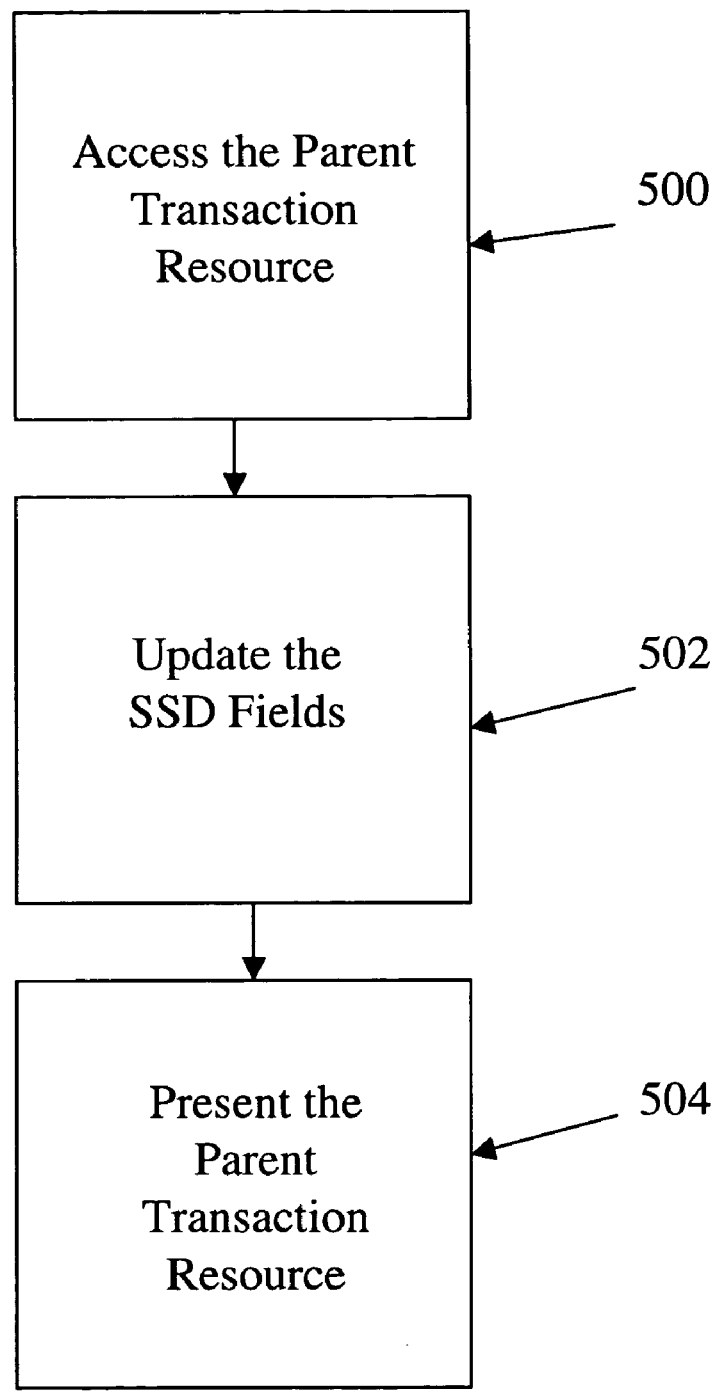
FIG. 4 is a block diagram of an alternative platform supporting the present invention.

Once the active document 10 is created, requests to view the active document 10 can be processed. As shown in FIG. 4, a method of viewing the active document 10 comprises the steps of accessing the parent transaction resource 500, updating the SSD fields of the parent transaction resource 502 and presenting the parent transaction resource 504. The accessing step 500 includes sending a request to access the parent transaction resource 12 from a client 28 to the core 22. A user seeking to view the active document 10 may send the request through a web browser 42; the user's web-browser 42 address identifies the client 28. The request includes the identifier 18. The core 22 processes the request to access the parent transaction resource 12. The core 22 searches metadata stored in the repository 24 to find a match to the identifier 18. Upon finding a match, the core 22 examines the permissions 19 to determine if the client 28 is permitted to access the parent transaction resource 12. If the client 28 is so permitted, the core 22 examines the SSD fields 16 to determine the resource handler 30 for the parent transaction resource 12. Once determined, the core 12 forwards the request to the resource handler 30.

The updating step 502 is conducted by the resource handler 30 and the core 22. The resource handler 30 determines the sub-identifiers 180 included in the SSD fields 16 and sends a request to the core 22 for each sub-transaction resource 120 so identified. The core 22 processes these requests as above and forwards the requests to the resource handler 30 (Note: the resource handler 30 for the parent transaction resource 12 and the sub-transaction resources 120 are assumed to be the same for the present discussion, although there may be different resource handlers 30 for each of the resources). The resource handler 30 physically accesses the parent transaction resource 12 and the sub-transaction resources 120 and compares the transaction specific data 145 with the corresponding SSD fields 16. If any transaction specific data 145 is different then the metadata 14 in a corresponding SSD field 16, the resource handler 30 updates the corresponding SSD field 16. Any changes to the metadata 14 are stored in the repository 24.

The presenting step 504 comprises the resource handler 30 sending the parent transaction resource 12 to the requesting client 28 through the core 22. The requesting client 28 receives the parent transaction resource 12 and the presenting step 504 further comprises the client 28 displaying the parent transaction resource 12 on the web browser 43 to the user. Since the parent transaction resource is in XML format, the user can view the parent transaction resource 12 and its metadata 14.

Once the parent transaction resource 12 and a sub-transaction resource 120 are linked, the core 22 will access the parent transaction resource 12 anytime the sub-transaction resource 120 is accessed, including when the sub-transaction resource 120 is registered. Accordingly, any changes made in the sub-transaction resource 120 to transaction specific data 145 will automatically be made in the corresponding SSD fields 16 of the parent transaction resource 12, as described above in the updating step. The parent transaction resource 12 effectively "subscribes" to changes "published" by the sub-transaction resource 120. The published changes are known as "events" in the e-speak system, as described in the e-speak documents.

Figure 5:
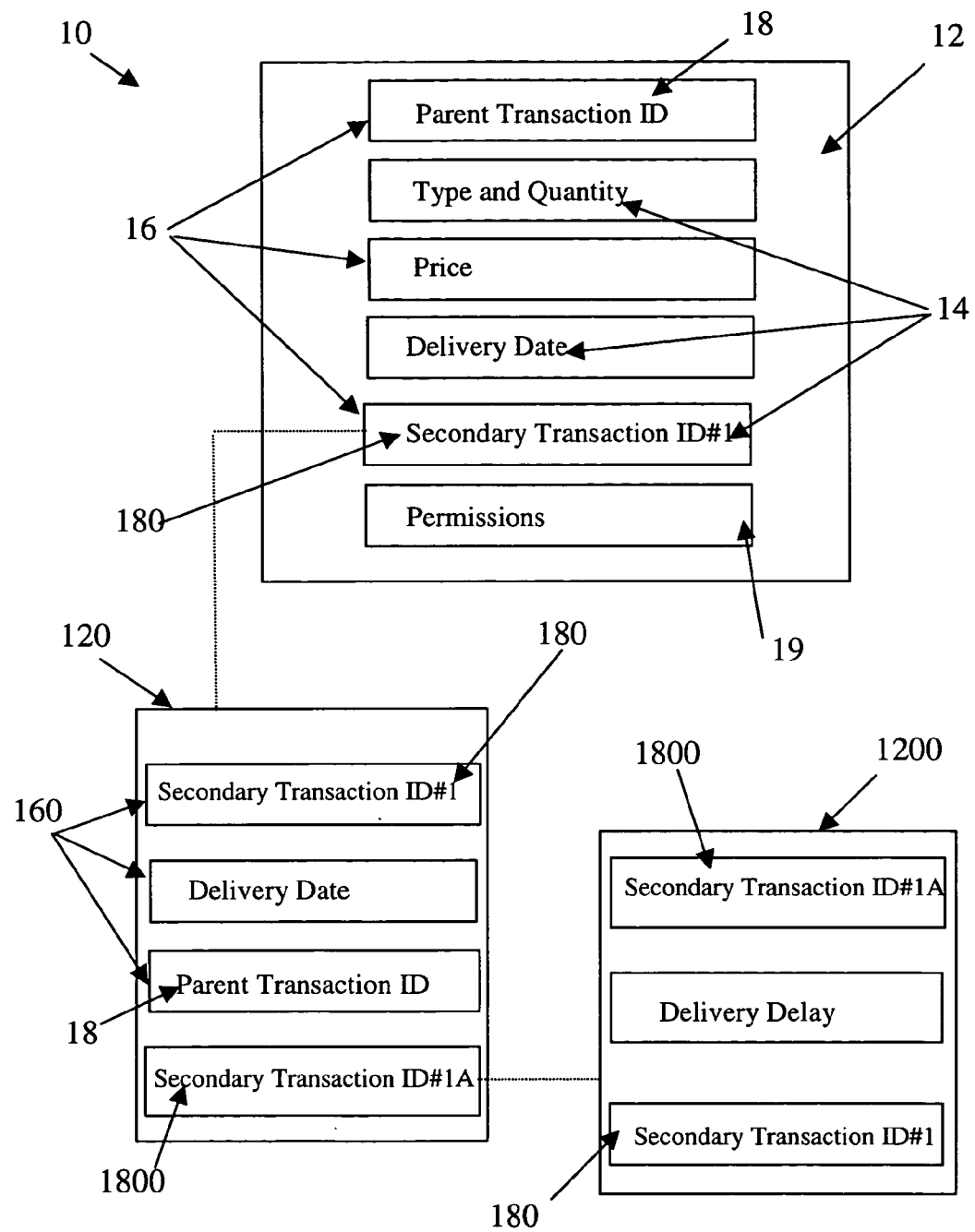
FIG. 5 is a diagram of another embodiment of the present invention.

As illustrated in FIG. 5, secondary transactions may spin-off or create additional processes or transactions. In such a situation, a sub-transaction resource 120 acts as a parent transaction resource for a secondary sub-transaction resource 1200. The sub-transaction resource 120 and the secondary sub-transaction resource 1200 are linked in same manner as described above. Any changes to transaction specific data 1450 in the secondary sub-transaction resource 1200 are likewise automatically made in corresponding SSD fields 160 of the sub-transaction resource 120.

As a result, the sub-transaction resource 120 also becomes an active document 10'. The sub-transaction resource 120 can be accessed as an active document 10', viewing it to determine the status or other information about the additional process or transaction. However, changes made to transaction specific data 145 in the sub-transaction resource 120 will still automatically update corresponding SSD fields 16, including those changes resulting from changes to transaction specific data 1450 in the secondary sub-transaction resource 1200.

Any active document 10 can be catalogued in e-speak folders (not shown) in the repository 24. E-speak folders are organized similarly to "Bookmarks" or "Favorites" in web-browsers. Typically, the e-speak folders are named with the an appropriate title indicating the type of active documents 10 found therein. For example, as noted above, a purchase order may be an active document 10. Accordingly, purchase orders are catalogued in a purchase order e-speak folder in the repository 24. Subsequently, whenever an enterprise wished to create a purchase order active document 10, it access the purchase order e-speak folder 32 to view a sample purchase order. If the sample purchase order was appropriate for the type of product or service that the enterprise wished to purchase, the enterprise would use the sample purchase order as a template for a new parent transaction resource. The enterprise would clear the old metadata from the SSD fields of the purchase order and enter new metadata in the SSD fields describing the attributes of the purchase order. The new parent transaction resource would then be registered and linked as described above.

Figure 6:
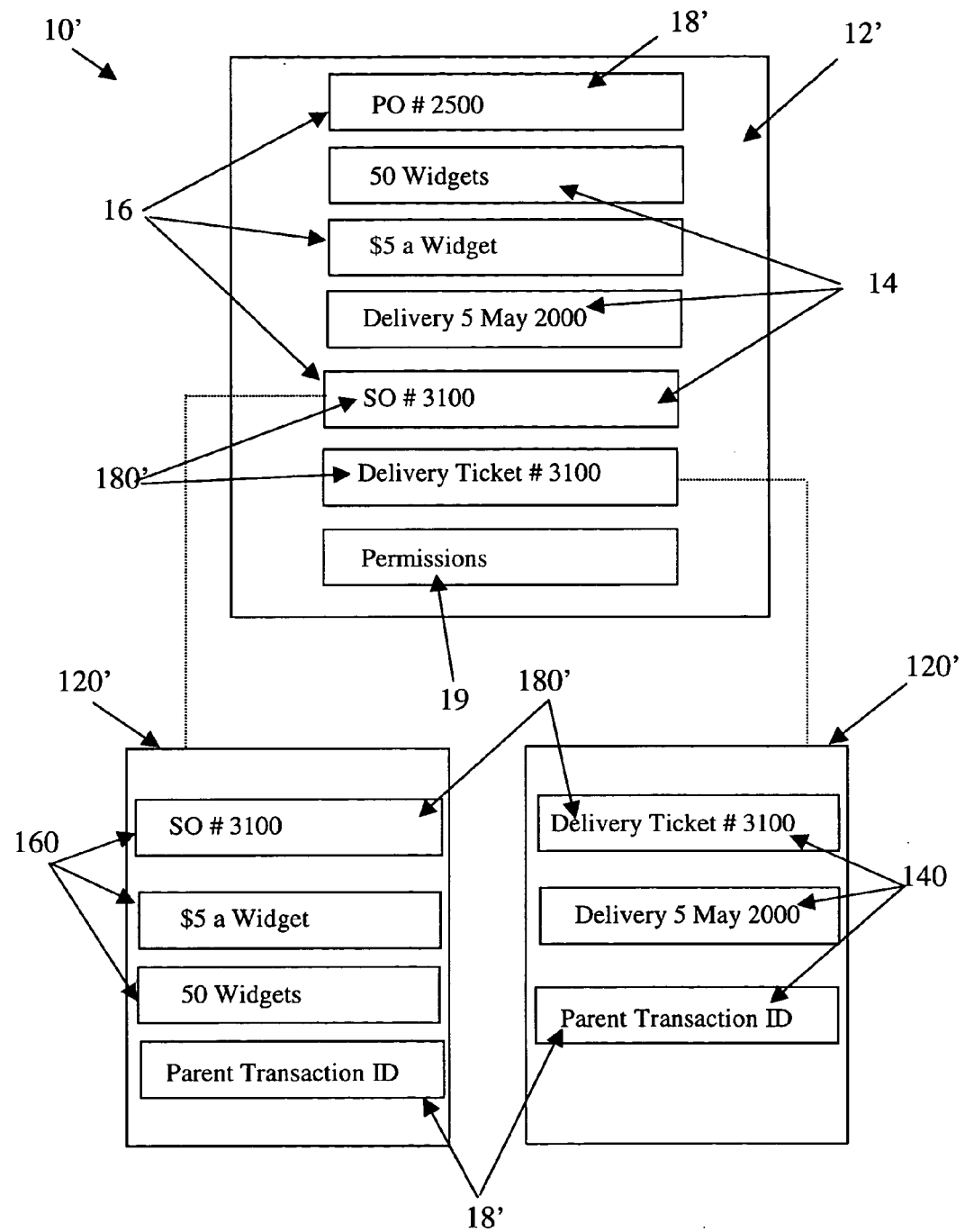
FIG. 6 is diagram illustrating an example of application of the present invention.

FIG. 6 illustrates a sample active document 10. The active document 10 comprises a purchase order resource 12'. The purchase order resource 12' includes the following SSD fields 16: type and quantity of product being purchased, 50 widgets; price, $5 a widget; and, expected delivery, 5 May 2000. The purchase order resource 12' also includes: an identifier 18', which is the purchase order number, PO#2; a first sub-identifier 180, which is a sales order number, SO#3; and, a second sub-identifier 180, which is a delivery ticket number, D.T.#1. Accordingly, the purchase order resource 12' is linked to a sales order resource 120' and a delivery ticket resource 120'. The sales order resource 120' comprises type and quantity and price SSD fields 160 with transaction specific data 145' corresponding to the first two SSD fields 16 described above. The delivery ticket resources 120' comprises a delivery expected SSD field 160 with transaction specific data 145' corresponding to the third SSD field 16 described above. Likewise, both the sales order resource 120' and the delivery ticket resource 120' contain the identifier 18 and their own sub-identifiers. As can be seen by examining FIG. 6, when a user accesses the purchase order resource 12', the user will be able to view all of the relevant information from one source.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What is claimed is:

1. A method for creating an active document that encapsulates a transaction and the transaction's current status, comprising:

creating a parent transaction resource, wherein the parent transaction resource represents and encapsulates data of one parent transaction and is linked to data generated by one or more secondary transactions and wherein the data generated by the one or more a secondary transactions are used to change contents of the parent transaction resource if corresponding contents of the one or more secondary transactions are updated, wherein the creating the parent transaction resource comprising:

generating a first set of data fields, wherein the first set of data fields represent attributes of the parent transaction and include one or more sub-identifier fields, one or more data fields that are updated with data from the one or more secondary transactions and data fields that are independent of the one or more secondary transactions and are not updated with data from the one or more secondary transactions; and populating the first set of data fields with a first set of metadata, wherein the metadata describes the attributes represented by the data fields, the first set of metadata including:

one or more sub-identifiers that populate the sub-identifier fields, wherein the sub-identifiers identify the one or more secondary transaction resources and include linking data generated by the one or more secondary transaction resources to link the one or more secondary transaction resources to the parent transaction resources, wherein the linking data generated by the one or more secondary transaction resources is used to change contents of the parent transaction resources if corresponding contents of the one or more secondary transaction resources have been changed;

an identifier, wherein the identifier identifies the parent transaction resource;

one or more permissions that identify one or more client computers that are permitted to access the parent transaction resource through a network, wherein the parent transaction resource is stored on a core connected to the client computers via the network; and resource handler metadata, wherein the resource handler metadata identifies a resource handler that physically accesses the parent transaction resource from the core.

2. The method of claim 1 further comprising:
creating a sub-transaction resource, wherein the sub-transaction resource represents a secondary transaction, the creating a sub-transaction resource comprising:
generating a second set of data fields, wherein the second set of data fields represent attributes of the secondary transaction and include an identifier field; and
populating the second set of data fields with a second set of metadata, wherein the metadata describes the attributes represented by the data fields and includes transaction specific data that corresponds to at least one of the first set of data fields in the parent transaction resource.

3. The method of claim 2, further comprising:
linking the parent transaction resource and the secondary transaction resource so that changes made to the transaction specific data are made in the corresponding at least one of the first set of data fields in the parent transaction resource.

4. The method of claim 3, wherein the linking comprises:
populating the sub-identifier field with metadata that identifies the secondary transaction; and
populating the identifier field with metadata that identifies the parent transaction.

5. The method of claim 2, further comprising:
registering the parent transaction resource and the sub-transaction resource in a repository, whereby the first set of metadata and the second set of metadata may be accessed and updated.

6. The method of claim 1, wherein the creating is conducted by submitting code written in a programming language that supports extensible markup language, the code comprising the first set of data fields and the first set of metadata.

7. The method of claim 6, wherein the programming language is Java, C++, Perl or Python.

8. The method of claim 1, wherein the parent transaction is related to the secondary transaction, the method further comprising:
tracking multiple related transactions using the active document.

9. An active document encapsulating a transaction and the transaction's current status, comprising:
a parent transaction resource, wherein the parent transaction resource represents and encapsulates data of one parent transaction and is linked to data generated by one or more secondary transaction resources and wherein the data generated by the one or more secondary transaction resources are used to change contents of the parent transaction resource if corresponding contents of the one or more secondary transaction resources are updated, the parent transaction resource comprising:

a first set of data fields, wherein the data fields represent attributes of a parent transaction and include a sub-identifier field, one or more data fields that are updated with data from the one or more secondary transaction resources and data fields that are independent of the one or more secondary transaction resources and are not updated with data from the one or more secondary transaction resources; and a first set of metadata, wherein the first set of metadata populates the first set of data fields and describes the attributes represented by the first set of data fields, the sub-identifier field including metadata from the first set of metadata that identifies the one or more secondary transaction resources, the metadata in the sub-identifier field including linking data generated by the one or more secondary transaction resources to link the one or more secondary transaction resources to the parent transaction resources, wherein the linking data generated by the one or more secondary transaction resources is used to change contents of the parent transaction resources if corresponding contents of the one or more secondary transaction resources have been changed, the first set of metadata further including:

an identifier, wherein the identifier identifies the parent transaction resource;

one or more permissions that identify one or more client computers that are permitted to access the parent transaction resource through a network, wherein the parent transaction resource is stored on a physical machine connected to the client computers via the network; and resource handler metadata, wherein the resource handler metadata identifies a resource handler that physically accesses the parent transaction resource from the physical machine.

10. The active document of claim 9, wherein the sub-identifier field links the parent transaction resource to a first secondary transaction resource which comprises a second set of data fields and a second set of metadata that populates the second set of data fields, whereby changes to the first secondary transaction resource are reflected in the parent transaction resource.

11. The active document of claim 10, wherein the second set of data fields includes a sub-identifier field that links the first secondary transaction resource to a second secondary transaction resource which includes a third set of data fields and a third set of metadata that populates the third set of data fields, whereby changes to the second secondary transaction resource are reflected in the first secondary transaction resource.

12. The active document of claim 10 wherein changes to the first secondary transaction resource are reflected in only one data field in the parent transaction resource.

13. The active document of claim 9, wherein the first set of metadata is stored in a repository that is accessed by the core.

14. The active document of claim 13, wherein the core matches the sub-identifier field to one of the one or more secondary transaction resources and updates the first set of data fields by populating at least one data field in the first set of data fields with the data generated by the secondary transaction resource.

15. The active document of claim 9, wherein the active document is written in extensible markup language and is capable of being displayed by a web browser.

16. The active document of claim 9, wherein the data fields include a permissions fields which includes the permissions.

17. The active document of claim 9, wherein the data fields include a second sub-identifier field that includes metadata that identifies a second secondary transaction resource, linking data generated by the second secondary transaction resource to the parent transaction resource.

* * * * *